(12) United States Patent
Miyajima

(10) Patent No.: US 7,062,643 B2
(45) Date of Patent: Jun. 13, 2006

(54) SYSTEM METHOD AND APPARATUS FOR CONTROLLING A BOOT PROCESS OF A COMPUTER (75) Inventor: Tsuyoshi Miyajima, Matsumoto (JP)

(73) Assignee: Fujitsu Limited, Kawasaki (JP)

( * ) Notice: Subject to any disclaimer, the term of this patent is extended or adjusted under 35 U.S.C. 154(b) by 573 days.

(21) Appl. No.: 09/789,518

(22) Filed: Feb. 22, 2001

(65) Prior Publication Data

US 2002/0016909 A1  Feb. 7, 2002

(30) Foreign Application Priority Data

Aug. 1, 2000  (JP) ............................. 2000-233224

(51) Int. Cl.
  *G06F 9/00*  (2006.01)
(52) U.S. Cl. .............................................. 713/1; 713/2
(58) Field of Classification Search .................... 713/1, 713/2, 100
See application file for complete search history.

(56) References Cited

U.S. PATENT DOCUMENTS 6,178,503 B1 * 1/2001 Madden et al. ................. 713/2
6,446,203 B1 * 9/2002 Aguilar et al. .................. 713/2
6,490,677 B1 * 12/2002 Aguilar et al. .................. 713/1

FOREIGN PATENT DOCUMENTS

| JP | 61-166629 | 7/1986 |
| JP | 64-67671 | 3/1989 |
| JP | 4-60739 | 2/1992 |
| JP | 6-301502 | 10/1994 |
| JP | 10228434 A * | 8/1998 |

OTHER PUBLICATIONS

"New Partition Methodology for IA-32 and New Platforms", Research Disclosure, May 1, 1999, UK.*

* cited by examiner

*Primary Examiner*—Lynne H. Browne
*Assistant Examiner*—Paul Yanchus
(74) *Attorney, Agent, or Firm*—Staas & Halsey LLP

(57) ABSTRACT

A processing apparatus for controlling a boot process thereof, is provided with a holding part which holds selected boot control information, and a boot controller which carries out the boot process based on boot control information held by the holding part during a previous boot process, when booting the processing apparatus.

18 Claims, 6 Drawing Sheets

```
PXE-M04 Initializing network boot using interrupt 18h

Press F10 Start the Network Boot Menu(10)
```

FIG.5B

| Network Boot Menu | |
|---|---|
| USER 01 (Remote OS Setup) <br> CP0002 (CLONE) <br> CP0003 (CLONE) | |
| Cursor:Select  Enter:Decision  ESC:Cancel | |

FIG.5C

| NETWORK MODE:FUNCTION SELECTION |
|---|
| PLEASE SELECT FUNCTION OF: <br> DISK BACKUP <br> [PARTITION BACKUP] <br> [DISK RESTORE] <br> [PARTITION RESTORE] |

SYSTEM METHOD AND APPARATUS FOR CONTROLLING A BOOT PROCESS OF A COMPUTER

BACKGROUND OF THE INVENTION

This application claims the benefit of a Japanese Patent Application No. 2000-233224 filed Aug. 1, 2000, in the Japanese Patent Office, the disclosure of which is hereby incorporated by reference.

1. Field of the Invention

The present invention generally relates to processing apparatuses, managing apparatuses, processing methods and storage media, and more particularly to a processing apparatus, a managing apparatus, a processing method and a computer-readable storage medium for controlling a boot of a computer.

When setting an operating environment of a computer which is typified by a personal computer, an operating system or an application program is installed independently at a stand-alone computer or from a server. Such a setting of the operating environment is made when setting up a new computer or an unrecoverable error or fault is generated in the computer.

When setting the operating environment in the above described manner with respect to a plurality of computers, it is necessary to repeat similar operations with respect to each of the computers, thereby putting an extremely large operation load on the user. In addition, in order to set the operating environment, a floppy disk which stores a system file is created, for example, and this floppy disk is used to boot the computer.

2. Description of the Related Art

Recently, for the purposes of reducing the operation load on the user, techniques have been proposed to prestore, in a server, a disk image of the computer in the form of a file. A client computer then requests the disk image file with respect to the server, and the disk image file which is received from the server via a network is developed in a disk drive such as a hard disk drive.

On the other hand, as is known in a PXE (Preboot eXecution Environment) or the like, techniques have been proposed to register in advance a boot image, such as a system and an application program, in the server. When the power of the client computer is turned ON, the boot image is downloaded from the server via the network so as to boot the computer.

According to these proposed techniques, the boot image is downloaded from the server when booting the computer, and the disk image file is downloaded from the server using the application program included in the boot image, to thereby enable setting of the operating environment of the computer.

When employing the network boot function which boots the computer via the network as described above, one of the following two methods are conventionally employed.

A first method uses a boot image which is set for each client. In other words, the server presets boot images corresponding to each of the clients. On the other hand, the client makes a boot request with respect to the server when turning the power of the computer ON or when rebooting the computer. In response to this boot request, the server sends to the client which made the boot request the boot image which is preset with respect to this client. The client which receives the boot image from the server develops the boot image in a memory, and continues a process using the boot image.

A second method selects an image file which is to be used at the client. In other words, the server manages a plurality of disk image files, and sends a list of the managed disk image files to the client which makes a boot request. The list of the managed disk image files is displayed at the client which makes the boot request. When the selects a desired boot image from the list of the managed disk image files displayed at the client, a transfer request requesting the transfer of the desired boot image is sent from the client to the server. In response to this transfer request, the server sends the desired boot image to the client which made the transfer request. The client which receives the desired boot image from the server develops the desired boot image in a memory, and continues a process using the desired boot image.

By employing either one of the first and second methods described above, it is possible to reduce the operation load on the user when compared to the conventional techniques which do not use the network boot function. However, the following problems occur even by use of the network boot function.

According to the first method, the boot images corresponding to each of the clients are preset in the server. In other words, the correspondence of the clients and the corresponding boot images used by the clients are preset. For this reason, if an error exists in the boot image which is downloaded to the client and the application program included in the boot image is not started normally, the client computer may be rebooted to again download the set boot image, but the same error will be generated again. As a result, there was a problem in that it is impossible in such a case to carry out the operations such as booting the computer and setting the operating environment of the computer using the network boot function.

On the other hand, according to the second method, when rebooting the computer using the application program included in the boot image, the user must select the same boot image again when rebooting the computer.

Therefore, the conventional techniques used to control the boot of the computer were unable to sufficiently and considerably reduce the operation load on the user.

SUMMARY OF THE INVENTION

Accordingly, it is a general object of the present invention to provide a novel and useful processing apparatus, managing apparatus, processing method and computer-readable storage medium in which the problems described above are eliminated.

Another and more specific object of the present invention is to provide a processing apparatus, a managing apparatus, a processing method and a computer-readable storage medium which can effectively control a boot of a computer so as to sufficiently and considerably reduce an operation load on a user.

Still another object of the present invention is to provide a processing apparatus for controlling a boot process thereof, comprising a holding part which holds selected boot control information, and a boot controller which carries out the boot process based on boot control information held by the holding part during a previous boot process, when booting the processing apparatus. According to the processing apparatus of the present invention, it is possible to effectively control the boot of the processing apparatus without putting an operation load on the user.

A further object of the present invention is to provide a processing apparatus for controlling a boot process thereof, comprising a holding part which holds a boot flag, and a boot controller which carries out a boot process indicated by the boot flag when booting the processing apparatus. According to the processing apparatus of the present invention, it is possible to effectively control the boot of the processing apparatus without putting an operation load on the user.

Another object of the present invention is to provide a managing apparatus for managing boot information which is used by a boot process of an other apparatus, comprising a transfer processor which receives a request for transfer of the boot information from the other apparatus, and a controller which instructs the transfer processor to transfer the boot information specified by the request or list information related to the boot information managed by the managing apparatus, to the other apparatus, in response to the request. According to the managing apparatus of the present invention, it is possible to effectively control the boot of the processing apparatus without putting an operation load on the user.

Still another object of the present invention is to provide a processing method for controlling a boot process of a computer, comprising the steps of (a) holding selected boot control information, and (b) carrying out the boot process based on boot control information held by the step (a) during a previous boot process, when booting the computer. According to the processing method of the present invention, it is possible to effectively control the boot of the computer without putting an operation load on the user.

A further object of the present invention is to provide a processing method for controlling a boot process of a computer, comprising the steps of (a) holding a boot flag, and (b) carrying out a boot process indicated by the boot flag when booting the computer. According to the processing method of the present invention, it is possible to effectively control the boot of the computer without putting an operation load on the user.

Another object of the present invention is to provide a processing method for managing, in a computer, boot information which is used to by a boot process of an other computer, comprising the steps of (a) receiving a request for transfer of the boot information from the other computer, and (b) instructing transfer of the boot information specified by the request or list information related to the boot information managed by the computer, to the other computer, in response to the request. According to the processing method of the present invention, it is possible to effectively control the boot of the computer without putting an operation load on the user.

Still another object of the present invention is to provide a computer-readable storage medium which stores a program for causing a computer to control a boot process thereof, where the program comprises the steps of (a) causing the computer to hold selected boot control information, and (b) causing the computer to carry out the boot process based on boot control information held by the step (a) during a previous boot process, when booting the computer. According to the computer-readable storage medium of the present invention, it is possible to effectively control the boot of the computer without putting an operation load on the user.

A further object of the present invention is to provide a computer-readable storage medium which stores a program for causing a computer to control a boot process thereof, where the program comprises the steps of (a) causing the computer to hold a boot flag, and (b) causing the computer to carry out a boot process indicated by the boot flag when booting the computer. According to the computer-readable storage medium of the present invention, it is possible to effectively control the boot of the computer without putting an operation load on the user.

Another object of the present invention is to provide a computer-readable storage medium which stores a program for causing a computer to manage boot information which is used to by a boot process of an other computer, where the program comprises the steps of (a) causing the computer to receive a request for transfer of the boot information from the other computer, and (b) causing the computer to instruct transfer of the boot information specified by the request or list information related to the boot information managed by the computer, to the other computer, in response to the request. According to the computer-readable storage medium of the present invention, it is possible to effectively control the boot of the computer without putting an operation load on the user.

Still another object of the present invention is to provide a system comprising a processing apparatus and a managing apparatus which manages the processing apparatus, wherein the processing apparatus comprises a holding part which holds selected boot control information, a request part which requests boot information with respect to the managing apparatus based on boot control information which is held by the holding part during a previous boot process, when booting the processing apparatus, and a boot controller carrying out a boot process based on the boot information which is received from the managing apparatus in response to the request, and the managing apparatus comprises a transfer processor which transfers the boot information to the processing apparatus in response to the request received from the processing apparatus. According to the system of the present invention, it is possible to effectively control the boot of the processing apparatus without putting an operation load on the user.

A further object of the present invention is to provide a system comprising a processing apparatus and a managing apparatus which manages the processing apparatus, wherein the processing apparatus comprises a holding part which holds a boot flag which indicates a boot process based on boot control information which is registered in advance or a boot process based on boot control information which is selected by a user, a request part which requests transfer of boot information indicated by the boot control information or list information related to boot information managed by the managing apparatus, with respect to the managing apparatus, based on the boot flag when booting the processing apparatus, and a boot controller which carries out the boot process based on the boot information, and the managing apparatus comprises a transfer processor which transfers the boot information to the processing apparatus in response to the request received from the processing apparatus. According to the system of the present invention, it is possible to effectively control the boot of the processing apparatus without putting an operation load on the user.

Other objects and further features of the present invention will be apparent from the following detailed description when read in conjunction with the accompanying drawings.

DESCRIPTION OF THE PREFERRED EMBODIMENTS

A description will now be given of an embodiment of a processing apparatus, a managing apparatus, a processing method and a computerreadable storage medium according to the present invention. Of course, a system including the processing apparatus and the managing apparatus also falls within the scope of the present invention.

Figure 1:
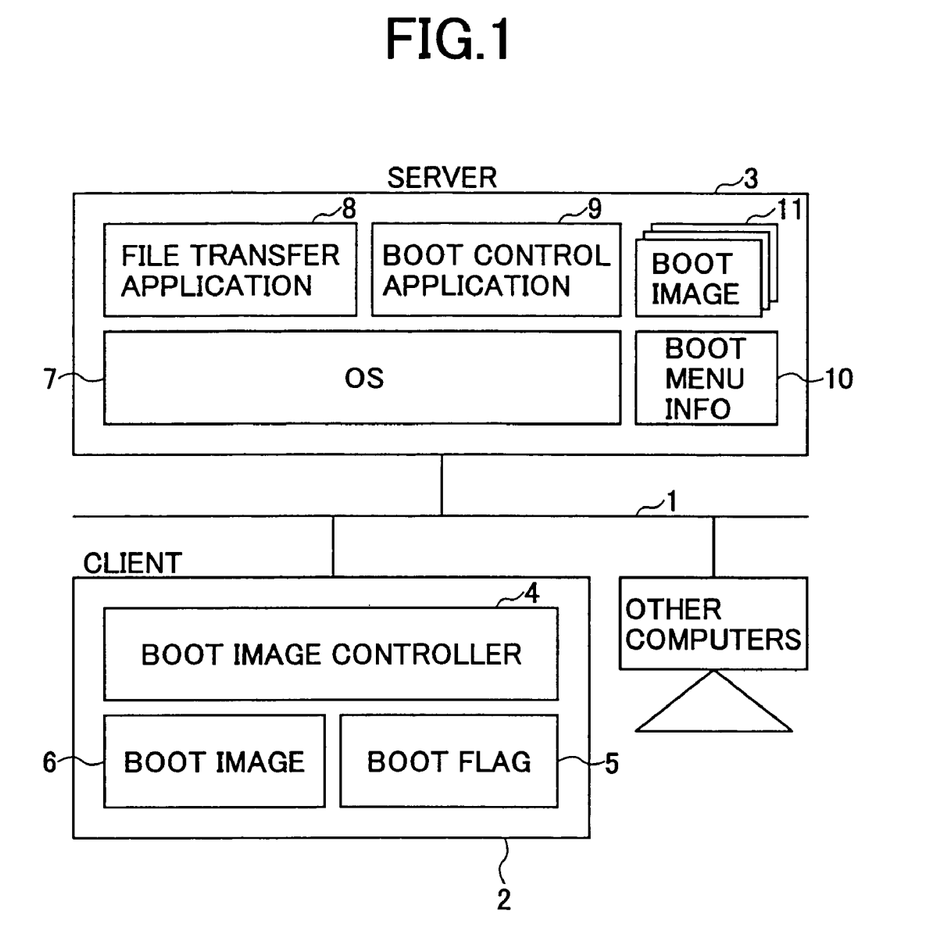
FIG. 1 is a system block diagram showing a general system structure used by an embodiment of the present invention.

FIG. 1 is a system block diagram showing a general system structure used by an embodiment of the present invention. In FIG. 1, a client 2 and a server 3 are connected via a network 1. The client 2 corresponds to the processing apparatus according to the present invention, and the server 3 corresponds to the managing apparatus according to the present invention. The processing method according to the present invention is carried out by at least one of the client 2 and the server 3. The network 1 may be formed by a telephone line network, a local area network (LAN), and a broadband network such as the Internet. The client 2 is formed by a computer having a known structure, such as a personal computer and a work station. The server 3 is formed by a computer having a known structure, such as a personal computer and a work station.

In the system structure shown in FIG. 1, the client 2 includes a boot image controller 4, a boot flag 5, and a boot image 6.

The boot image controller 4 is provided in correspondence with the PXE, and requests transfer of a boot menu or a boot image with respect to the server 3 based on the boot flag 5 when booting the client 2. The boot image controller 4 also develops the boot menu and the boot image acquired from the server 3 within a memory (not shown) of the client 2. The boot image 6 in the client 2 is acquired from the server 3 by the processing method of the present invention.

The boot image 6 includes an operating system, various kinds of device drivers, one or more application programs and various kinds of data used thereby. The operating system, the device drivers, the application programs and the data are stored in a single file in the form of binary data. The application program included in the boot image 6 is used to acquire a disk image file from the server 3, and to set the operating environment of the client 2. The disk image file is a single file which stores the files existing within a hard disk, for example. The disk image file includes a number of partitions, offset information of each partition from a beginning, and data of each partition, where the data of each partition include identification information and real data.

The boot flag 5 which is referred to when booting the client will be described later. In addition, as will be described later, functions of the boot image controller 4 can be realized by executing a program which is stored in an embodiment of the computer-readable storage medium according to the present invention by a CPU 20 shown in FIG. 2 of the client 2. The computer-readable storage medium may be formed by any kind of a recording medium capable of storing a program, such as card-shaped recording media, disk-shaped recording medium including a floppy disk 32 shown in FIG. 2, an optical disk and a magneto-optical disk, and semiconductor memory devices.

On the other hand, the server 3 shown in FIG. 1 includes an operating system 7, a file transfer application program 8, a boot control application program 9, boot menu information 10, and a plurality of boot images 11.

In the server 3, the file transfer application program 8 operates on the operating system 7, and realizes a data communication with the client 2. The boot control application program 9 also operates on the operating system 7, and returns the boot menu information 10 and the boot image 11 by the file transfer application program 8 depending on the request from the client 2. The boot control application program 9 is stored in an embodiment of the computer-readable storage medium according to the present invention by the CPU 20 shown in FIG. 2 of the server 3.

Figure 2:
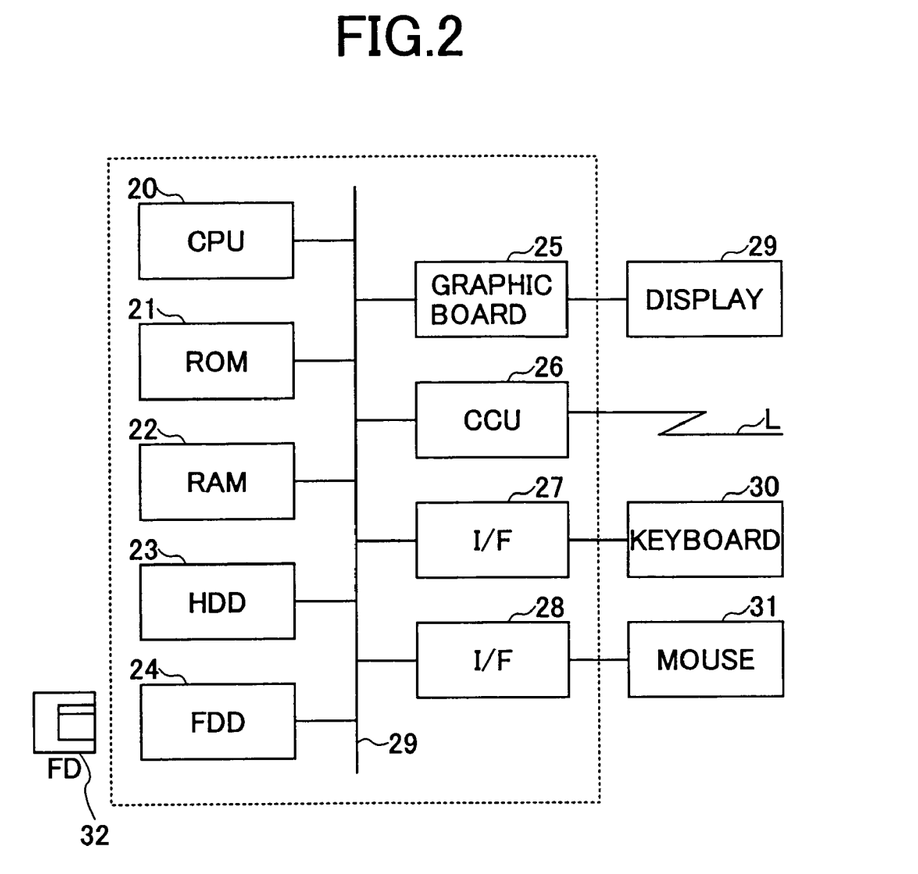
FIG. 2 is a system block diagram showing a hardware structure of a computer.

Next, a description will be given of the hardware structure of the computers forming the client 2 and the server 3. FIG. 2 is a system block diagram showing the hardware structure of a computer which may be used as the client 2 and the server 3.

The computer shown in FIG. 2 includes the CPU 20, a ROM 21, a RAM 22, a hard disk drive (HDD) 23, a floppy disk driver (FDD) 24, a graphic board 25, a communication control unit (CCU) 26 for using the network 1, interfaces (I/Fs) 27 and 28, and a bus 29 which are connected as shown.

A display unit 29 is connected to the graphic board 25, and a communication line L is connected to the communication control unit 25. A keyboard 30 is connected to the interface 27, and a mouse 31 is connected to the interface 28.

Of course not all of the elements of the computer shown in FIG. 2 are essential to realize the functions of the client 2 and the server 3. In addition, it is not essential for the structures of the computer forming the client 2 and the computer forming the server 3 to be the same.

The ROM 21 stores a booting program. In the case of the computer which forms the client 2, the ROM 21 stores a basic input output system (BIOS) corresponding to the PXE, which is executed by the CPU 20 when booting the computer such as when the power of the computer is turned ON.

A program for controlling the computer is developed in the RAM 22. In addition, data including intermediate data and results of processes carried out by the program, and display data which are developed to be displayed on a display screen of the display unit 29, are stored in the RAM 22. The display data developed in the RAM 22 are supplied to the display unit 29 via the graphic board 25 and displayed on the display screen.

In the case of the computer which forms the client 2, the boot menu information 10 and the boot image 11 acquired from the serve 3 are developed in the RAM 22. The boot image 11 acquired from the server 3 is developed in the RAM 22 as the boot image 6. The RAM 22 is also used to carry out processes such as setting the operating environment by an application program included in the boot image 6.

On the other hand, in the case of the computer which forms the server 3, the operating system 7, the file transfer application program 8 and the boot control application program 9 are developed in the RAM 22.

The hard disk drive 23 is provided to record programs and control data in a corresponding recording medium, that is, a hard disk. Similarly, the floppy disk drive 24 is provided to record the programs and control data in a corresponding recording medium, that is, the floppy disk 32.

In this embodiment, the boot flag 5 is recorded in the hard disk of the hard disk drive 23 of the client 2, and a reference is made to this boot flag 5 when booting the client 2. On the other hand, the operating system 7, the file transfer application program 8, the boot control application program 9, the boot menu information 10, and the plurality of boot images 1 are recorded in the hard disk of the hard disk drive 23 of the server 3.

The communication control unit 26 of the computer is used to exchange data with another computer or the like via the communication line L, and to download programs from another computer or the like, such as the server 3.

The keyboard 30 may have a known structure including a plurality of alphanumeric keys and arrow keys for inputting various kinds of data. The mouse 31 may also have a known structure for specifying an arbitrary position on the display screen of the display unit 29 and selecting a button or the like on the display screen, using a mouse cursor.

Figure 3:
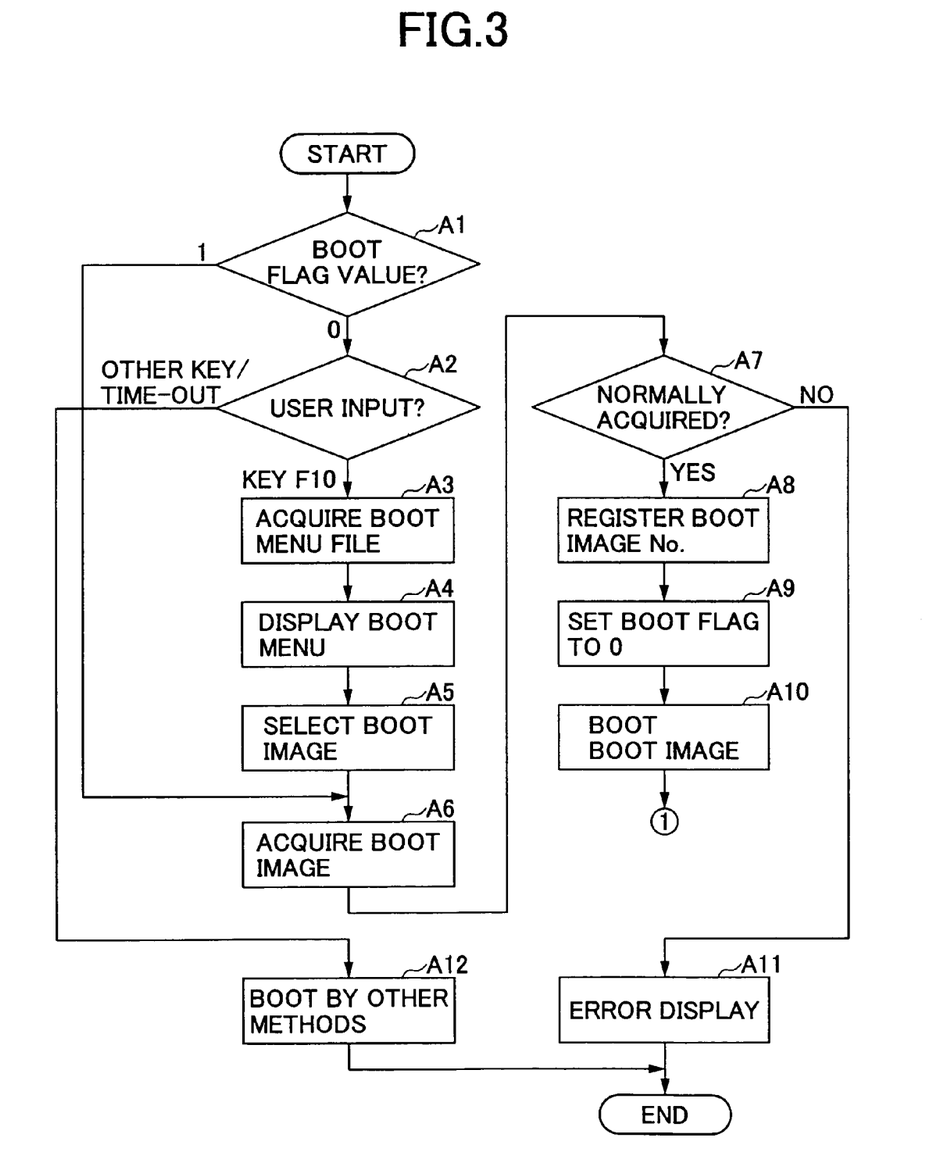
FIG. 3 is a flow chart for explaining an operation of the embodiment of the present invention.
Figure 4:
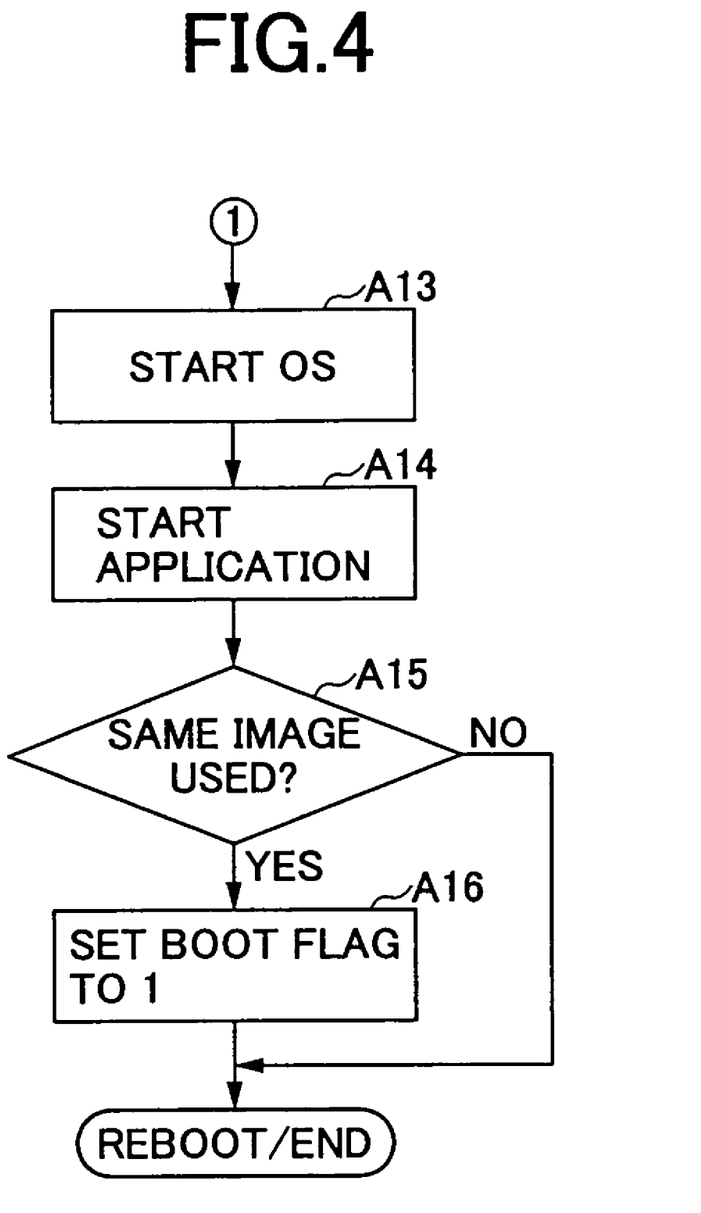
FIG. 4 is a flow chart for explaining the operation of the embodiment of the present invention.

Next, a description will be given of the operation of this embodiment, by referring to FIGS. 3 and 4. FIGS. 3 and 4 are flow charts for explaining the operation of this embodiment.

The following preprocessing is carried out prior to carrying out the process shown in FIG. 3. First, in a boot process which is carried out when the power of the client (computer) 2 is turned ON or a reboot instruction is issued, the BIOS of the client 2 operates and requests transfer of a bootstrap code with respect to the server (computer) 3 which is indicated by PXE status information.

The bootstrap code which is received from the server 3 in response to this request from the client 2 is developed in the RAM 22 of the client 2, so as to carry out the process thereafter based on this bootstrap code.

The program for causing the computer to carry out the processing method according to the present invention, that is, a boot control process, is prerecorded in a recording unit such as the RAM 22 of the server 3. This program is downloaded from the server 3 to the client 2, to be recorded in a recording unit such as the RAM 22 of the client 2.

Accordingly, the process shown in FIG. 3 is started when a network boot of the client 2 is instructed by the power ON or the reboot by the application program. First, a step Al refers to the boot flag 5 which is recorded in the hard disk of the client 2, and decides whether the boot flag 5 is 0 or 1. The boot flag 5 indicates an automatic boot, that is, an automatic download of the boot image, when the value thereof is 1. On the other hand, the boot flag 5 indicates no automatic boot, that is, no automatic download of the boot image, when the value thereof is 0.

When the decision result in the step Al indicates that the boot flag 5 is 0, a step A2 displays a screen shown in FIG. 5A which will be described later to urge the user to select whether or not the network boot is to be carried out. The step A2 waits for an input to be made by the user, and decides whether a predetermined key such as a function key F10 of the keyboard 30 is pushed to select the network boot or, other keys of the keyboard 30 are pushed or a predetermined time has elapsed (time-out has occurred) without an input being made. If the decision result in the step A2 indicates that the function key 10 is pushed, it is judged that the network boot is selected. On the other hand, it is judged that the network boot is not selected if the decision result in the step A2 indicates that the keys other than the function key F10 are pushed or the predetermined time has elapsed without an input being made.

If the decision result in the step A2 indicates that the function key F10 is pushed, a step A3 acquires the boot menu information 10 by requesting transfer of the boot menu information 10 with respect to the server 3, so as to make the network boot.

On the other hand, if the decision result in the step A2 indicates that the keys other than the function key F10 are pushed or the predetermined time has elapsed without an input being made, a step A12 boots the client 2 by a boot method other than the network boot, such as a hard disk boot, and the normal operation using the client 2 is ended.

A step A4 displays on the display unit 29 the boot menu which is a list of boot images 11 managed by the server 3, depending on the contents of the boot menu information 10 acquired from the server 3.

When the user selects a desired boot image from the boot menu in a step A5, a step A6 acquires the desired one of the boot images 11 from the server 3 by requesting transfer of the desired boot image 11 with respect to the server 3. This step A6 is also carried out if the decision result in the step Al indicates that the boot flag 5 is 1.

A step A7 decides whether or not the desired boot image 11 which is requested is normally acquired from the server 3. If the decision result in the step A7 is YES, a step A8 registers a boot image number of the desired boot image 11 in the PXE status information. Thereafter, a step A9 sets the boot flag 5 of the PXE status information to 0, and a step A10 develops the desired boot image 11 which is acquired in the RAM 22, and boots the desired boot image 11. The process advances to a step A13 shown in FIG. 4 after the step A10.

On the other hand, if the decision result in the step A7 is NO, an error display is made on the display unit 29, and the process ends.

When the boot image 11 is booted in the step A10, a step A13 shown in FIG. 4 starts the operating system (OS) which is included in the boot image 11. In addition, a step A14 starts an application program which is included in the boot image 11.

In the process of the application program, a step A15 decides whether or not it is necessary to use a boot image identical to the boot image which is presently being used when making a reboot. If the decision result in the step A15 is YES, a step A16 sets the boot flag 5 to 1. After the step A16 or if the decision result in the step A15 is NO, the process ends depending on the process of the application program or, a reboot process of the client 2 is carried out.

When ending the process of the application program or when booting the client 2 by a reboot instruction, a reference is made to the boot flag 5. If the boot flag 5 is set to 1 by the step A16 shown in FIG. 4 described above, it means that the application program included in the boot image which is downloaded during a previous boot operated normally, and thus, the automatic downloading of the boot image 11 is instructed for the present boot.

On the other hand, in a case where the boot image 11 is normally downloaded during the previous boot but the application program included in the boot image 11 does not operate normally, the boot flag 5 remains set to 0 by the step A9 shown in FIG. 3. Hence, using the displayed boot menu, the user may in this case select a boot image which is different from the boot image 11 which is downloaded during the previous boot. As a result, it is possible to carry out an operation using a boot image which operates normally.

The above described step A15 shown in FIG. 4 decides whether or not the identical boot image 11 is to be used. However, in a case where it is possible to know the boot image which will be used during the next boot, the boot flag 5 may be set to 1 and the boot image number indicating this boot image may be recorded in the PXE status information.

Therefore, according to this embodiment, when rebooting the client 2, the network boot using the boot image which is different from the boot image which is presently being used can be carried out without requiring a selecting operation to be performed by the user.

Next, a description will be given of the screens which are displayed on the display unit 29 in this embodiment, by referring to FIGS. 5A, 5B and 5C. FIGS. 5A, 5B and 5C are diagrams showing the screens displayed on the display unit 29 at the boot of the client 2.

Figure 5A:
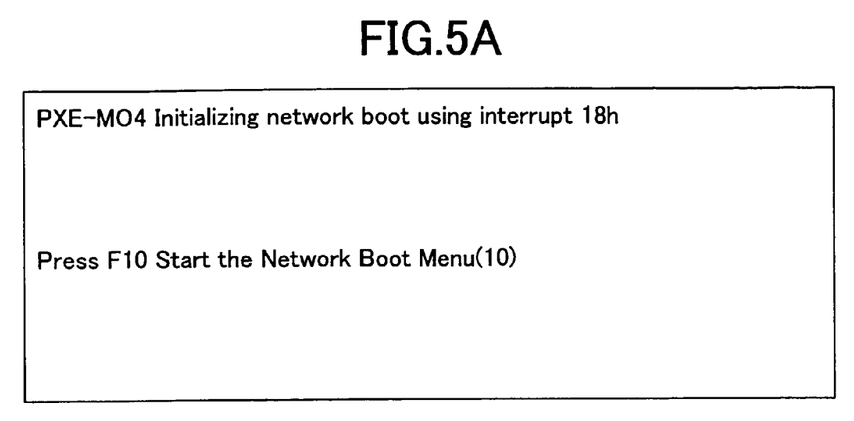
FIGS. 5A, 5B and 5C are diagrams showing screens displayed at a boot of a client.
Figure 5B:
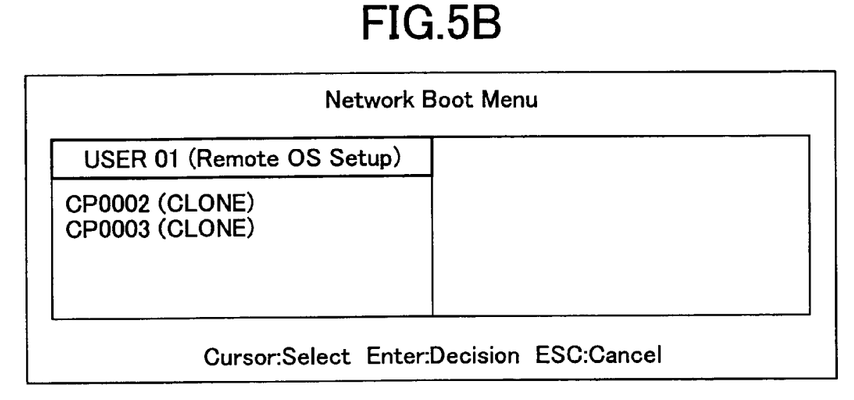
Figure 5C:
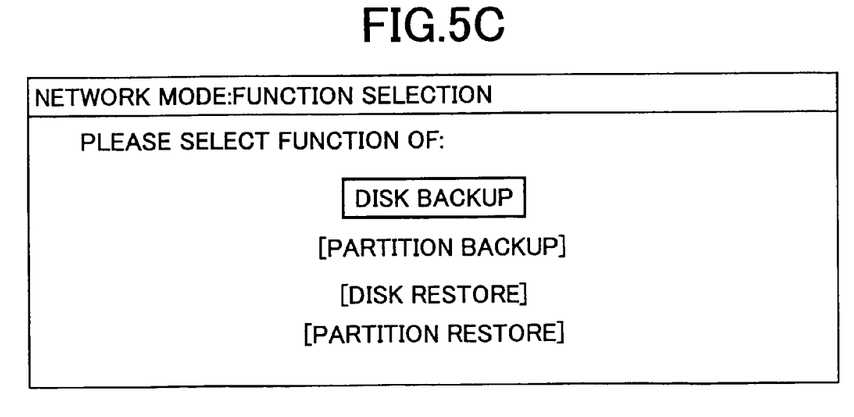

FIG. 5A shows the screen which is displayed on the display unit 29 in a case where the power of the client 2 is turned ON or the reboot process is carried out by the application program, the network boot by the PXE is set, and the decision result in the step A1 shown in FIG. 3 indicates that the boot flag 5 is 0.

When the predetermined key, that is, the function key F10 in the case of this embodiment, is pushed by the user in the state shown in FIG. 5A, the transfer of the boot menu information 10 is requested with respect to the server 3 by the step A3 shown in FIG. 3.

FIG. 5B shows the screen which is displayed on the display unit 29 in a case where the boot menu is displayed based on the boot menu information 10 which is received from the server 3. In each menu item, the information on the left side indicates a computer name which identifies the computer that created the image file, and the information on the right side indicates the type of the image file.

When the desired boot image 11 is selected by the user from the items displayed on the boot menu in the step A5 shown in FIG. 3, the transfer of the desired boot image 11 is requested with respect to the server 3 and is acquired from the server 3 in the step A6 shown in FIG. 3.

FIG. 5C shows the screen which is displayed on the display unit 29 by he application program included in the desired boot image 11 which is selected. As shown in FIG. 5C, the application program in this embodiment can carry out processes including disk backup, partition backup, disk restore and partition restore.

The disk backup creates an image file of a specified disk, and transfers the disk image file to the server 3. The partition backup carries out a process similar to the disk backup, except that the processing target is in units of partitions. The disk restore downloads the selected one of the disk image files managed in the server 3 to the client 2, and develops the downloaded disk image file in the hard disk of the hard disk drive, for example. The partition restore carries out a process similar to the disk restore, except that the processing target is in units of partitions.

Figure 6:
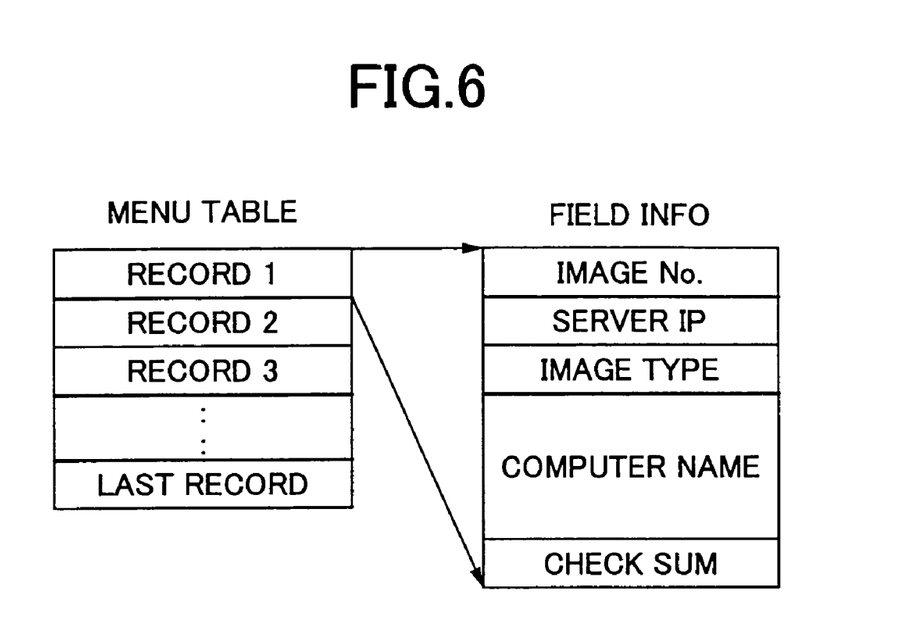
FIG. 6 is a diagram showing a data structure of boot image information.

FIG. 6 is a diagram showing a data structure of the boot image information 10 which is used to display the boot menu shown in FIG. 5B on the display unit 29.

As shown in FIG. 6, the boot image information 10 has the form of a table made up of a collection of records corresponding to each of the menu items. Each record includes field information of an image number, a server IP, an image type, a computer name, and a check sum.

The image number field records a unique numerical value for specifying the boot image, and is used to specify the selected boot image which is to be transferred to the client 2 in response to the boot image transfer request from the client 2.

In this embodiment, the image number can take a number from 0 to 255 in binary value. In a last record, a predetermined value such as 0xffff is recorded in the image number field, and no information is recorded in the other fields.

The server IP field records an IP address of the server 3 which manages the selected boot image, and is used as request destination information for making the boot image transfer request from the client 2 to request the selected boot image.

The image type field records the type of the boot image, and indicates the process which uses the boot image when executed. For example, the image type field indicates the boot image which is used to set the operating environment by the disk image file, the boot image which is used simply for the network boot, and the like.

The computer name field records the computer name which is registered in the boot image, so as to identify the computer which created the boot image. The computer name is displayed on the boot menu.

The check sum field records the check sum in units of records, and is used to judge the validity of the data.

Figure 7:
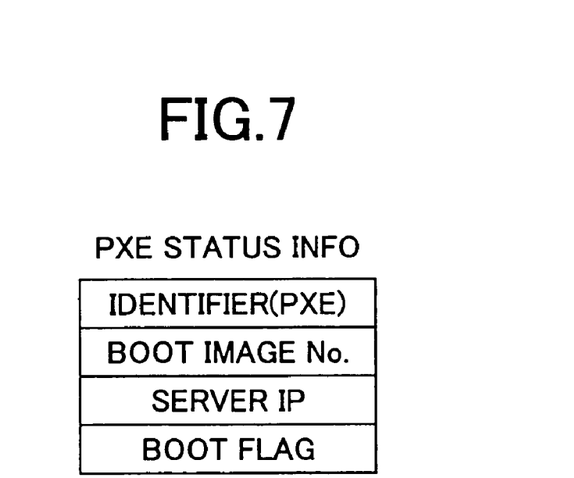
FIG. 7 is a diagram showing a data structure of PXE status information.

Next, a description will be given of the information which is referred to at the boot of the client 2. The information which is referred to is recorded on the hard disk in the hard disk drive 23 of the client 2, in a sector 2 following a master boot record (MBR) of a sector 1. This information which is recorded includes the PXE status information shown in FIG. 7. FIG. 7 is a diagram showing a data structure of the PXE status information.

As shown in FIG. 7, the PXE status information includes an identifier, a boot image number, a server IP address, and the boot flag 5.

The identifier of the PXE status information identifies the data, and indicates the PXE status information in this embodiment. The boot image number indicates the image number of the boot image which is to be requested by the boot image transfer request with respect to the server 3 when the boot flag 5 indicates the automatic boot when booting the client 2. The server IP address indicates the IP address of the server 3 which is accessed when the network boot is carried out. The transfer of various files is requested with respect to the server 3 using this IP address.

The boot flag 5 is used to judge whether the transfer of the boot menu is to be requested with respect to the server 3 or the transfer of the boot image indicated by the image number is to be requested with respect to the server 3, when booting the client 2. The boot flag 5 of this embodiment takes a value 0 or 1. When the boot flag 5 is 0, the boot menu transfer request is made and the boot process is carried out by making the user selection. On the other hand, when the boot flag 5 is 1, the transfer of the boot image indicated by the image number is requested, and the automatic boot is carried out without requiring the user selection.

In this embodiment, the boot flag 5 is recorded in the hard disk of the client 2. However, it is of course possible to record the boot flag 5 in the hard disk of the server 3. In this case, the client 2 may be designed to receive the boot flag 5 from the server 3 together with the bootstrap code during an initial operation of the client 2. In addition, when setting the value of the boot flag 5, the client 2 may request rewriting of the boot flag 5 and notify the new value to the server, so that the server 3 may carry out the necessary rewriting of the boot flag 5.

Therefore, according to this embodiment, it is possible to switch between the network boot which omits the user selection and the network boot which requires the user selection, depending on the situation, so that the boot of the computer can be effectively controlled.

In order to facilitate interpretation of the claims appended hereto, it should be noted that, in the processing apparatus according to the present invention which is formed by the client 2, a holding part corresponds to the recording unit such as the hard disk or hard disk drive of the client 2, and boot control information corresponds to the boot image number of the PXE status information recorded in the recording unit of the client 2. A boot controller corresponds to the bootstrap code which is downloaded from the server 3. In addition, a request part, an indicating part and a receiving part also correspond to this bootstrap code. Moreover, a boot flag corresponds to the boot flag 5 of the PXE status information.

It should also be noted that, in the managing apparatus according to the present invention which is formed by the server 3, a transfer processor corresponds to the file transfer application program 8, and a controller corresponds to the boot control application program 9.

Further, the present invention is not limited to these embodiments, but various variations and modifications may be made without departing from the scope of the present invention.

What is claimed is:

1. A processing apparatus for controlling a boot process thereof, comprising:
   a holding part configured to hold selected boot control information and a boot flag that indicates an automatic or a non-automatic boot process;
   a boot controller configured to carry out the boot process indicated by the boot flag based on boot control information held by the holding part during a previous boot process, when booting the processing apparatus, wherein the boot control information is based on operation of an application program included in a boot image; and
   a setting part configured to set the boot flag to indicate the non-automatic boot process before carrying out the boot process based on the boot control information.

2. The processing apparatus as claimed in claim 1, further comprising a request part configured to request transfer of boot information with respect to an other apparatus based on the boot control information,
   said boot controller carrying out the boot process based on the boot information that is received from the other apparatus in response to the request made by the request part.

3. The processing apparatus as claimed in claim 1, wherein said boot flag indicates a boot process based on boot control information that is registered in advance or a boot process based on boot control information that is selected by a user.

4. The processing apparatus as claimed in claim 3, further comprising an indicating part configured to indicate a boot menu urging the user to select the boot control information,
   said boot controller carrying out the boot process depending on the boot control information that is selected from the boot menu.

5. The processing apparatus as claimed in claim 4, further comprising a receiving part configured to receive the boot menu from an other apparatus,
   said boot controller receiving the boot information corresponding to the boot control information is selected from the received boot menu, and carrying out the boot process based on the received boot information.

6. A processing method for controlling a boot process of a computer, comprising:
   holding selected boot control information and a boot flag that indicates a boot process;
   carrying out the boot process indicated by the boot flag based on boot control information held by the holding selected boot control information during a previous boot process, when booting the computer, wherein the boot control information is based on operation of an application program included in a boot image; and
   setting the boot flag to indicate a non-automatic boot process before carrying out the boot process based on the boot control information.

7. The processing method as claimed in claim 6, further comprising requesting transfer of boot information with respect to an other computer based on the boot control information,
   said carrying out the boot process indicated by the boot flag being based on the boot information that is received from the other computer in response to the request made by the requesting transfer of boot information.

8. The processing method as claimed in claim 6, wherein said boot flag indicates a boot process based on boot control information that is registered in advance or a boot process based on boot control information that is selected by a user.

9. The processing method as claimed in claim 8, further comprising indicating a boot menu for urging the user to select the boot control information,
   said carrying out the boot process indicated by the boot flag being depending on the boot control information that is selected from the boot menu.

10. The processing method as claimed in claim 9, further comprising receiving the boot menu from an other computer,
    said carrying out the boot process indicated by the boot flag receiving the boot information corresponding to the boot control information which is selected from the received boot menu, and carrying out the boot process based on the received boot information.

11. A computer-readable storage storing a program for controlling a computer to control a boot process thereof, by:
    holding selected boot control information and a boot flag that indicates a boot process;
    carrying out the boot process indicated by the boot flag based on boot control information held by the holding selected boot control information during a previous boot process, when booting the computer, wherein the boot control information is based on operation of an application program included in a boot image; and
    setting the boot flag to indicate a non-automatic boot process before carrying out the boot process based on the boot control information.

12. The computer-readable storage storing a program for controlling a computer to control a boot process thereof, as claimed in claim 11 by, further requesting transfer of boot information with respect to an other computer based on the boot control information,
    said carrying out the boot process indicated by the boot flag carrying out the boot process based on the boot information is received from the other computer in response to the request made by the requesting transfer of boot information.

13. The computer-readable storage storing a program for controlling a computer to control a boot process thereof, as claimed in claim 11, wherein said boot flag indicates a boot process based on boot control information that is registered in advance or a boot process based on boot control information that is selected by a user.

14. The computer-readable storage storing a program for controlling a computer to control a boot process thereof, as claimed in claim 13 by, further indicating a boot menu urging the user to select the boot control information, said carrying out the boot process indicated by the boot flag carrying out the boot process depending on the boot control information that is selected from the boot menu.

15. The computer-readable storage storing a program for controlling a computer to control a boot process thereof, as claimed in claim 14 by, receiving the boot menu from an other computer, said carrying out the boot process indicated by the boot flag causing the computer to receive the boot information corresponding to the boot control information which is selected from the received boot menu, and carry out the boot process based on the received boot information.

16. A system, comprising:

a processing apparatus; and a managing apparatus that manages the processing apparatus, wherein said processing apparatus comprises:

a holding part configured to hold selected boot control information and a boot flag that indicates a boot process, a request part configured to request boot information with respect to the managing apparatus based on boot control information that is held by the holding part during a previous boot process, when booting the processing apparatus, and a boot controller configured to carry out a boot process indicated by the boot flag based on the boot information that is received from the managing apparatus in response to the request, wherein the boot control information is based on operation of an application program included in a boot image, and a setting part configured to set the boot flag to indicate the non-automatic boot process before carrying out the boot process based on the boot control information, and said managing apparatus comprises:

a transfer processor configured to transfer the boot information to the processing apparatus in response to the request received from the processing apparatus.

17. A processing method for controlling a booting of a computer, comprising:

detecting an error in a first boot process of the computer, wherein boot control information is based on operation of an application program included in a boot image; and carrying out automatically a second boot process upon detection of the error in the first boot process.

18. The processing method according to claim 17, further comprising providing a user of the computer an opportunity to initiate a boot process other than the first boot process prior to the carrying out automatically of the second boot process.

* * * * *

UNITED STATES PATENT AND TRADEMARK OFFICE
CERTIFICATE OF CORRECTION

PATENT NO. : 7,062,643 B2 Page 1 of 1
APPLICATION NO. : 09/789518
DATED : June 13, 2006
INVENTOR(S) : Tsuyoshi Miyajima It is certified that error appears in the above-identified patent and that said Letters Patent is hereby corrected as shown below:

On Title Page, Item (54)
(Title), Line 1, after "SYSTEM" insert --,--.

Signed and Sealed this

Nineteenth Day of December, 2006

JON W. DUDAS
*Director of the United States Patent and Trademark Office*